Feb. 24, 1942.   E. P. FORD   2,274,325
SANDWICH COOKER
Filed July 16, 1940   2 Sheets-Sheet 1
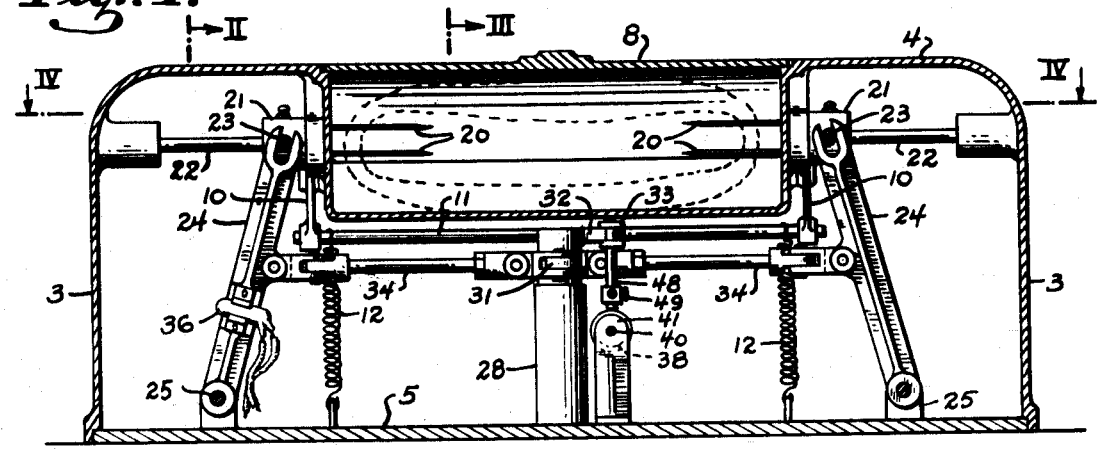
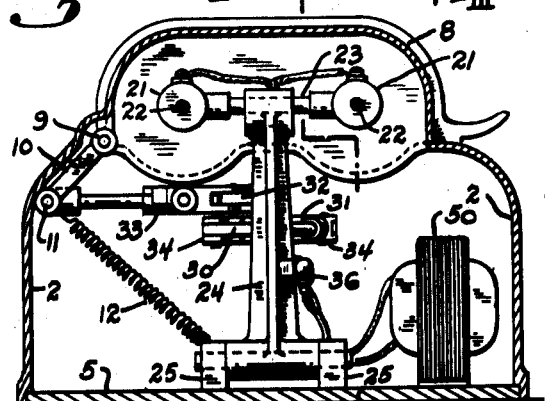
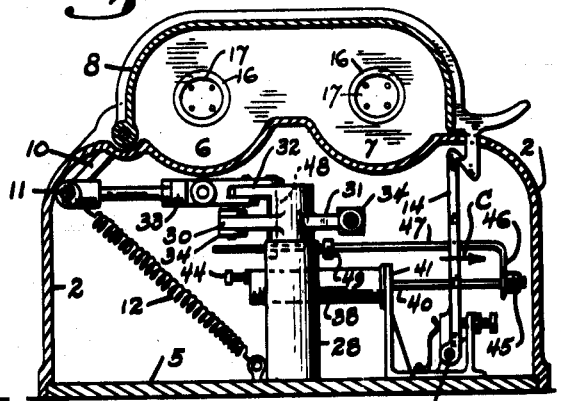
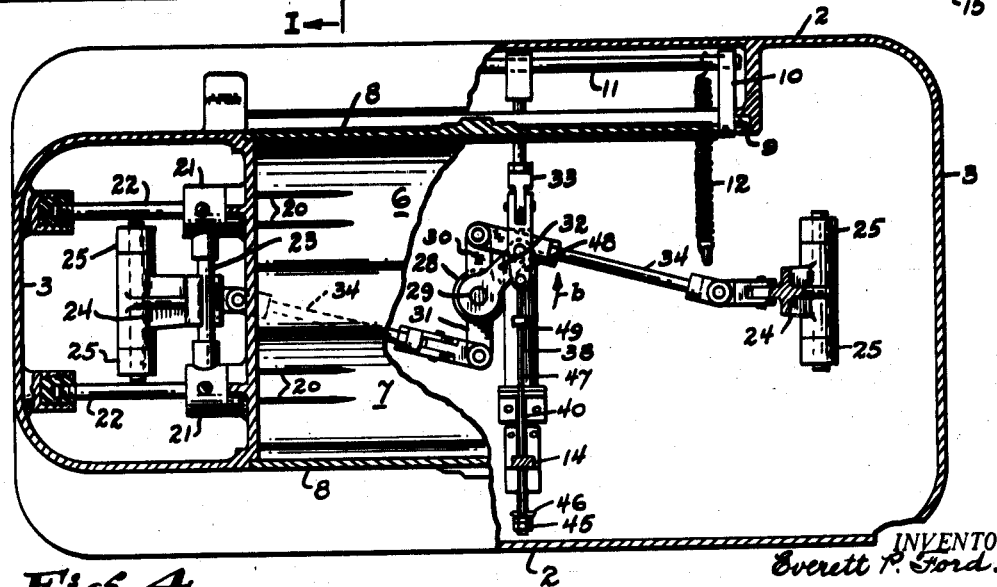

Feb. 24, 1942.   E. P. FORD   2,274,325
SANDWICH COOKER
Filed July 16, 1940   2 Sheets-Sheet 2
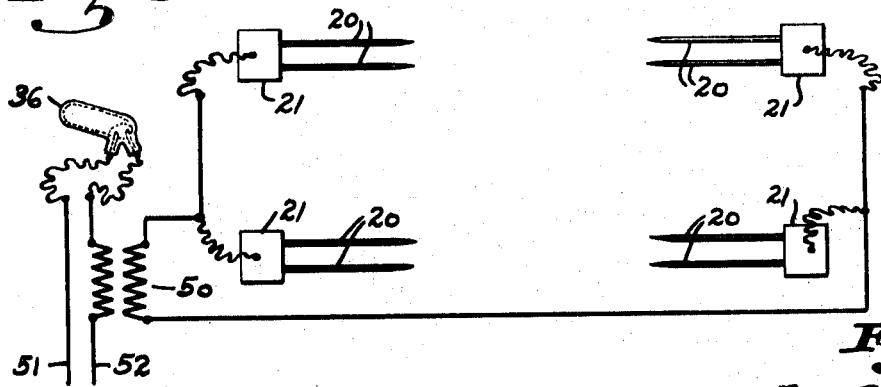
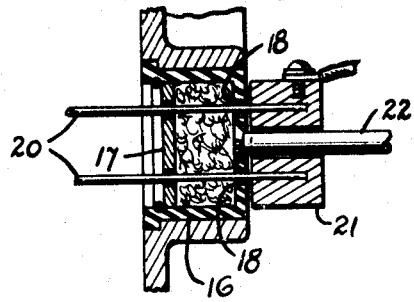
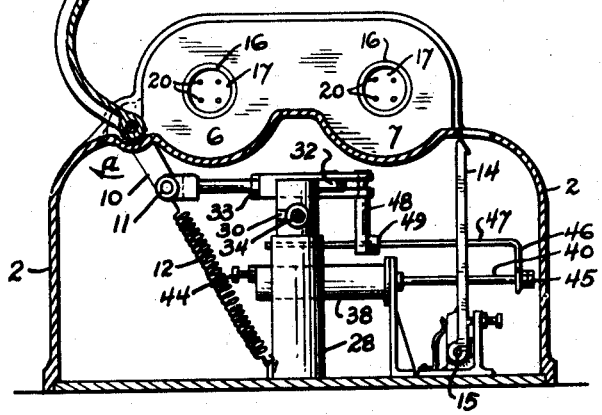
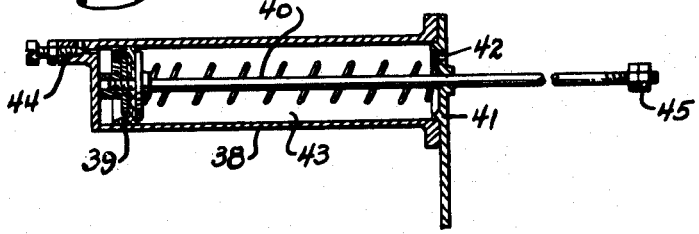
INVENTOR.
Everett P. Ford.
BY Chas. E. Townsend.
ATTORNEY Patented Feb. 24, 1942

2,274,325

UNITED STATES PATENT OFFICE 2,274,325

SANDWICH COOKER

Everett P. Ford, San Francisco, Calif., assignor of one-half to Lloyd H. Garrison, San Francisco, Calif.

Application July 16, 1940, Serial No. 345,697

7 Claims. (Cl. 219—19)

This invention relates to a cooking apparatus especially intended for roasting or heating wiener sandwiches or similar food commodities.

The object of the present invention is to provide an apparatus for heating or roasting small sausages such as wieners or frankfurters, and the like, which have been placed in a bun; to provide an apparatus which is intended for use on a counter of a lunch room, hot dog stand, or the like, the apparatus being capable of receiving one or more wiener sandwiches at a time, and of heating them by the flow of an electric current through the wieners; to provide an apparatus having a pivoted cover, and beneath it one or more pockets for the reception of the wiener sandwiches; to provide spits in the form of electrodes at opposite ends of each pocket, which are moved inwardly to enter the opposite ends of the wieners, said inward movement being actuated by closing of the cover, an electric circuit through the electrodes and wieners being closed by the same operation of the cover; and further, to provide means for automatically opening the cover, withdrawing the electrodes, and breaking the electric circuit, when the wiener sandwiches have been heated to a desired temperature.

The apparatus is shown by way of illustration in the accompanying drawings, in which Fig. 1 is a central vertical longitudinal section of the apparatus, taken on line I—I of Fig. 2;

Fig. 2 is a vertical cross section taken on line II—II of Fig. 1;

Fig. 3 is a vertical cross section taken on line III—III of Fig. 1;

Fig. 4 is a horizontal plan section taken on line IV—IV of Fig. 1, said section being partially broken away to show the linkage mechanism disposed below the wiener receiving pockets;

Fig. 5 is a diagrammatic view showing the wiring circuit of the apparatus;

Fig. 6 is a view similar to Fig. 3 showing the cover in open position;

Fig. 7 is an enlarged sectional view of one of the electrode supports and guides; and Fig. 8 is an enlarged longitudinal section of the dashpot mechanism.

Referring to the drawings in detail, and particularly to Figs. 1 to 4 inclusive, a housing is disclosed which consists of sides 2—2, ends 3—3, a top portion 4, and a removable bottom section 5. Formed in the top portion is a depression which is divided to provide two pockets 6 and 7, each of which is adapted to receive a wiener sandwich; and forming a closure for said pockets is a cover 8 which is pivoted at opposite ends to the housing as shown at 9. Secured to the cover adjacent each pivot is a crank arm 10, and secured between the lower ends of said crank arms is a rod 11 to which are secured a pair of springs 12—12. The cover is retained in closed position by a latch arm 14 pivoted to the bottom section as shown at 15. This latch is automatically released after the lapse of a predetermined time interval, as will hereinafter be described, and when released, the cover will be swung about its pivots, due to the pull of the springs 12, and will assume the open position shown in Fig. 6, where it will be retained until manually closed.

The sandwiches placed in the pockets 6 and 7 are heated by the flow of electric current, and this is accomplished as follows: Disposed at each end of each of the pockets 6 and 7 (see Fig. 7) is an insulator 16. Formed therein is a pocket in which is placed a perforated plate 17, and between it and the end of the insulator is placed a packing of steel wool or the like. Extending through the perforated plate and the packing disposed adjacent the same, and through openings 18 formed in the end face of the insulator, are a plurality of spits 20, which function as electrodes. There may be one, two, three or more of these electrodes, arranged in a group, and they are secured to a head member 21. Inasmuch as there are two pockets, and electrodes are disposed at each end of each pocket, there will be four head members such as shown at 21, and these are arranged in pairs; for instance, if reference is made to Fig. 4, it will be noted that there are two head members 21, and that these are slidably mounted on rods 22. The head members are connected by a crossbar 23 which happens to be constructed of insulating material, and this crossbar in turn is carried by and secured in the upper end of a rocker arm 24 which is pivoted between a pair of lugs 25 secured to the bottom plate. The head members at the opposite ends are supported and arranged in the same manner, so the description of one pair is thought sufficient.

The arms 24 disposed at opposite ends of the pockets actuate each pair of head members 21, and when the arms 24 are swung about their pivots 26, they will either retract the electrodes or force them inwardly through the opposite ends of the pockets into the sandwiches to be heated.

In the present instance the rocker arms 24 and electrodes actuated thereby are connected with the cover 8 to operate in unison therewith, This is accomplished as follows: Secured to the bottom plate 5 is an upwardly extending post 28, and pivoted on the upper end thereof, as shown at 29, are three connected crank arms 30—31—32. The crank arm 32 is connected through links 33 with the rod 11 carried by the cover crank arms 10, while the crank arms 30 and 31 are connected through links 34 with the rocker arms 24; hence if the cover is swung from the open position shown in Fig. 6 to the closed position shown in Figs. 2 and 3, the crank arms 10 will swing in the direction of arrow a (see Fig. 6), the rod 11 will swing in the same direction, and a pull will thus be exerted through the link 33 on the crank arm 32 to swing it in the direction of arrow b (see Fig. 4). Such movement will swing the crank arms 30 and 31 in a direction to cause the links 34 to swing the rocker arms 24 toward the pockets, and as the upper ends of the rocker arms carry the crossrods 23, the heads 21 will move inwardly or towards the pockets, and thus force the electrodes into the opposite ends of the wiener sandwiches places therein. One of the rocker arms 24 (see Fig. 1) carries a mercury-actuated switch, indicated at 36; that is, a glass tube having a pair of terminals and a small quantity of mercury which runs from end to end of the tube. This switch automatically closes the circuit through the terminals connected therewith, and a current flow through the electrodes and the wiener sandwich is thus established, and the flow will be continued until the sandwich has been heated to a predetermined temperature, when it will be automatically broken, during retraction of the electrodes and opening of the cover.

This is automatically accomplished, and is controlled by a dashpot mechanism of the type shown in Fig. 8. It consists of a cylinder 38, in which is mounted a piston carrying a cup leather 39; a piston rod 40 is secured thereto, which extends through one end of the cylinder, and a spring surrounds the piston rod and is interposed between the piston and the head 41 of the cylinder. An open vent 42 allows free flow of air on the side 43 of the piston, while a needle valve controlled vent 44 controls the flow of air on the opposite side of the piston. The rod 40 has a collar 45 on its outer end. This collar is engaged by the arm 46 (see Figs. 3 and 4) of a rod 47. The opposite end of the rod passes through a pin or lug 48 extending downwardly from the crank arm 32, and it is freely slidable in this lug. A collar 49 is secured on the rod, and its function is as follows: When the cover is released by means of the latch 14, the springs 12 will swing the cover to open position, and will reverse the movement of the crank arms and linkage mechanism previously described, thereby opening the cover and simultaneously withdrawing the electrodes, and furthermore breaking the circuit through the mercury switch 36. In addition thereto, lug 48 engages the collar 49 on the rod, and imparts longitudinal movement to the rod in the direction of arrow c (see Fig. 3). The downwardly extending end 46 of the rod will thus engage the piston rod collar 45, and it will force the piston to its outermost position, or to a position where the spring surrounding the piston rod is placed under compression, and it will be retained in this position until the cover is manually closed. When the cover is manually closed, the crank and link mechanism is again reversed, the electrodes are introduced, and the circuit through them is closed. Also the latch 14 engages and secures the cover closed, and it will remain in engaged position until the spring forces the piston 39 back to the position shown in Fig. 8. This movement is slow, as the air can only escape through the needle valve shown at 44. This may, however, be adjusted to give any time interval desired; for instance, if a current of 220 volts is employed, experience shows that the sandwich will be heated to a desired temperature in approximately 20 to 25 seconds. Thus, valve 44 will be regulated so that it takes 25 seconds for the piston to complete its travel. When it has done so, the extension 46 of rod 47 engages the latch 14, and releases it, thus permitting the springs 12 to automatically open the cover, withdraw the electrodes, and break the circuit through the same.

Inasmuch as most household circuits supply only 120-volt A. C. current, and a higher voltage is desired to insure comparatively rapid heating of the sandwiches, a transformer, such as diagrammatically illustrated at 50 in Fig. 5, is employed. The primary of this transformer is connected, through the wires 51 and 52, with a source of A. C. supply, and the circuit therethrough is controlled by the mercury-actuated switch 36. The secondary of the transformer, on the other hand, is connected with the electrodes, as indicated, and by using a step-up transformer, any voltage may be maintained through the electrodes during the heating period.

In actual practice it has been found that if only one electrode is introduced into the wiener sandwich at each end thereof, there is a tendency to scorch them in the vicinity of the electrode. To avoid this, it is preferable to use two, three or four electrodes, as previously stated, at each end. This distributes the current more uniformly and therefore prevents scorching and burning. It has also been found that the electrodes tend to become slightly coated or corroded, and that their conductive quality accordingly decreases. To prevent this, the plate 17 and the steel wool or similar cleaning medium which is packed between it and the end of the insulator are provided. That is, as the electrodes are pulled back and forth through the plate, their surfaces are scraped and cleaned by the plate and packing material, and they are thus automatically maintained in a clean, bright condition at all times.

Inasmuch as a comparatively high voltage current is employed, it is essential to protect the operator against receiving a shock either by touching the electrodes or by sticking a fork or similar implement into the sandwich while it is being heated. It is for this purpose that the cover is employed, as when this is closed the electrodes cannot be touched nor can a fork or similar implement be introduced while the current is flowing. Furthermore, the electrodes are automatically withdrawn when the cover is opened, and the circuit is broken, so that a shock cannot be suffered accidentally or otherwise during the operation of the apparatus.

While certain features of my invention have been more or less specifically described and illustrated, I nevertheless wish it understood that changes may be resorted to within the scope of the appended claims, and that the finish and materials may be such as the experience of the manufacturer may dictate and other conditions demand.

Having thus described my invention, what I claim and desire to secure by Letters Patent is

1. In a cooker of the character described, a housing having an elongated pocket formed therein for the reception of a wiener sandwich, a pair of electrodes disposed one at each end of the pocket and reciprocally movable into and out of the pocket in a direction longitudinal of the pocket, a pivoted cover for the pocket, spring actuated means normally maintaining the cover in an open position, a latch for retaining the cover in closed position, an adjustable spring actuated dashpot mechanism for automatically releasing the latch after a predetermined time interval, said release permitting the spring means to open the cover, and means actuated by opening and closing of the cover for retracting and introducing the electrodes with relation to the pocket and for simultaneously making or breaking an electric circuit through the electrodes and the sandwich.

2. In a cooker of the character described, a housing having an elongated pocket formed therein for the reception of a wiener sandwich, a pair of electrodes reciprocally mounted one at each end of the pocket and disposed on a line extending longitudinal of the pocket, a pivoted cover for the pocket, means actuated by closing of the cover for introducing the electrodes into the wiener in the sandwich and for closing an electric circuit through the electrodes and the wiener to heat the same, other means for automatically opening the cover, breaking the circuit, and withdrawing the electrodes after the lapse of a predetermined time interval, a recess formed at each end of the pocket, a perforated plate at each end of the recess, and a wiper material packed between said perforated plates, said electrodes during their movement into and out of the pocket passing through the perforated plates and the wiper material to maintain the surfaces of the electrodes in a bright condition.

3. In a cooker of the character described, a housing having an elongated pocket formed therein for the reception of a wiener sandwich, a pair of electrodes disposed one at each end of the pocket and reciprocally movable into and out of the pocket in a direction longitudinal of the pocket, a pivoted cover for the pocket, and means actuated by closing of the cover for moving the electrodes into the pocket, said means retracting the electrodes when the cover is opened.

4. In a cooker of the character described, a base member, a housing supported by the base and having an elongated pocket formed therein for the reception of a wiener sandwich, a pair of electrodes disposed in the housing one at each end of the pocket, said electrodes being reciprocally movable into and out of the pocket in a direction longitudinal of the pocket, a cover pivotally mounted on the housing, a crank arm on the cover adjacent the pivot, a pair of vertically disposed rocker arms one at each end of the pocket, said arms being pivoted at their lower ends to the base, a connection between the upper end of each rocker arm and an adjacent electrode whereby rocking movement of the arms is transmitted to move the electrodes into and out of the pocket, and means for transmitting movement from the cover crank arm to swing the rocker arms in unison and in a direction to retract the electrodes when the cover is opened and to move them inwardly when the cover is closed.

5. In a cooker of the character described, a base member, a housing supported by the base and having an elongated pocket formed therein for the reception of a wiener sandwich, a pair of electrodes disposed in the housing one at each end of the pocket, said electrodes being reciprocally movable into and out of the pocket in a direction longitudinal of the pocket, a cover pivotally mounted on the housing, a crank arm on the cover adjacent the pivot, a pair of vertically disposed rocker arms one at each end of the pocket, said arms being pivoted at their lower ends to the base, a connection between the upper end of each rocker arm and an adjacent electrode whereby rocking movement of the arms is transmitted to move the electrodes into and out of the pocket, means for transmitting movement from the cover crank arm to swing the rocker arms in unison and in a direction to retract the electrodes when the cover is opened and to move them inwardly when the cover is closed, and a switch actuated by pivotal movement of the cover to make or break a circuit through the electrodes.

6. In an electric cooker of the character described, a housing having an elongated pocket formed therein for the reception of a wiener sandwich, a head member disposed at each end of the pocket and movable to and away from the pocket in a direction longitudinal of the pocket, a plurality of combination electrodes and spits carried by each head member and movable into opposite ends of the pocket when the head members are moved toward the pocket, and means for closing an electric circuit through the head members and the spits when the spits are positioned within the pocket.

7. In an electric cooker of the character described, a housing having an elongated pocket formed therein for the reception of a wiener sandwich, a recess formed in the housing at each end of the pocket, a perforated plate at each end of each recess, a wiper material packed in each recess between the perforated plates, a pair of electrodes disposed one at each end of the pocket and movable to and away from the pocket on a line longitudinal of the pocket, each electrode comprising a head member and a plurality of combination electrodes and spits carried by each head member and extending through the perforated plates and the wiper material packed between them.

EVERETT P. FORD.